United States Patent [19]

Sondhaus

[11] 4,318,000

[45] Mar. 2, 1982

[54] METHOD OF AND DEVICE FOR IRRADIATING ANIMALS

[75] Inventor: Charles A. Sondhaus, Corona del Mar, Calif.

[73] Assignee: Kernforschungsanlage Jülich GmbH, Jülich, Fed. Rep. of Germany

[21] Appl. No.: 82,061

[22] Filed: Oct. 5, 1979

[30] Foreign Application Priority Data

Oct. 9, 1978 [DE] Fed. Rep. of Germany ....... 2844041

[51] Int. Cl.³ ...................... G01N 21/00; G01N 23/00

[52] U.S. Cl. .................................... 250/455; 250/494

[58] Field of Search ........... 250/493, 494, 455, 358 R, 250/492 R

[56] References Cited

U.S. PATENT DOCUMENTS

| | | | |
|---|---|---|---|
| 1,317,082 | 9/1919 | Hartenheim | 250/493 |
| 2,829,636 | 4/1958 | Itenschke | 250/494 |
| 3,433,949 | 3/1969 | Truhan | 250/455 |
| 4,124,804 | 11/1978 | Mirell | 250/358 R |

*Primary Examiner*—Bruce C. Anderson
*Attorney, Agent, or Firm*—Karl F. Ross

[57] ABSTRACT

A cage for research animals to be subjected to radiation comprises an enclosure formed by upper and lower plates and openwork spanning these plates. One of these plates is formed as a planar irradiator, e.g. by embedding a planar array of irradiation sources in spaced-apart relationship in the plate serving as the irradiator. The invention also relates to a method of irradiating animals for reseach purposes utilizing this cage.

9 Claims, 4 Drawing Figures

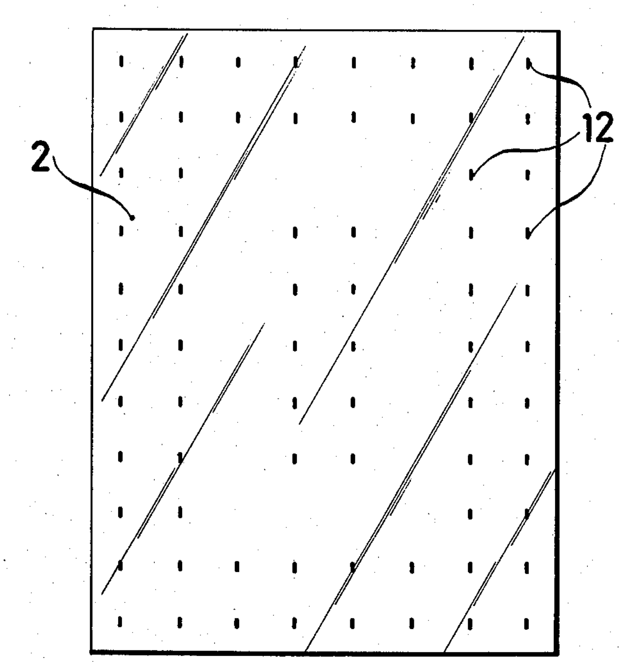
FIG. 2
FIG. 3
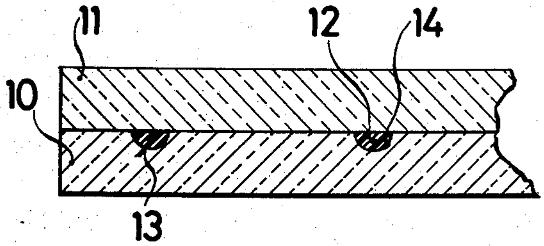

METHOD OF AND DEVICE FOR IRRADIATING ANIMALS

FIELD OF THE INVENTION

My present invention relates to the irradiation of research animals and, more particularly, to improvements in irradiation studies in which animals are subjected to a radiation flux from radioactive-isotope sources. Specifically, the invention relates to a device for the isotope irradiation of research animals and to an irradiation method.

BACKGROUND OF THE INVENTION

For a variety of purposes it may be necessary to subject laboratory or other research animals to radiation from radioactive-isotope sources, e.g. to check the radio-protective effects of pharmaceuticals. Until now investigations of the effect of radiation upon animals have utilized more or less point radiation sources around which the animals may be assembled or caused to pass or which are moved around the animals.

The point radiation sources have not been found to be effective because of the falloff of the radiation field with distance from the central sources, the inability to subject numbers of animals efficiently to a uniform radiation field and the requirement that the animals repeatedly move past and around the sources to obtain the necessary degree and uniformity of irradiation.

OBJECTS OF THE INVENTION

It is the principal object of the present invention, therefore, to provide an improved device which ensures a uniform radiation of a multiplicity of research animals within the desired time span without the disadvantages of earlier techniques as mentioned above.

Another object of my invention is to provide a method of irradiating a multiplicity of animals uniformly.

SUMMARY OF THE INVENTION

The objects are attained in accordance with the present invention which is based upon my discovery that it is relatively simple to bring about a uniform irradiation of a multiplicity of research animals if these animals are retained in a cage which is formed with a ceiling to floor formed as a plate-shaped or planar radiation source from which the radiation is emitted substantially uniformly over the entire surface of the plate within the cage.

More particularly, the invention comprises a cage-type enclosure for the animals having an upper plate, a lower plate and openwork walls bridging these plates, one or both of the plates being formed as a planar radiator of the particular radiant energy to which the animals are to be exposed.

According to a feature of the present invention, the radiating plate is provided with a multiplicity of small radiation sources distributed in a planar pattern and especially where the cage has a rectangular horizontal cross-section, in spaced-apart concentric rectangles (rectangular rings) inwardly from the outer edge. Each rectangular ring of radiation sources is preferably made up of a rectangular row of aligned elongated radiation members (e.g. wire sections) spaced apart along the respective rectangular rim.

It has been found to be particularly advantageous to provide these radiation sources between two layers or sheets of synthetic resin material which are bonded together to sandwich the array of radiation sources between them.

According to a feature of the invention, the planar irradiators are formed with positioning elements, e.g. at their corners, whereby the cage can be inserted between these elements over a planar irradiator or a planar irradiator can be placed over the cage, the positioning elements centering the planar irradiators with respect to the top and bottom of the cage.

According to a further feature of the invention, radiation sources are small elongated elements, e.g. activated pieces of iridium which are embedded in a plate, preferably by disposing the wire sections between two polyacrylate plates (preferably of plexiglass) which are bonded together. It has been found to be advantageous, in connection with this embodiment, to form one of the plates with a multiplicity of recesses in each of which a respective activated iridium wire is received and is preferably encapsulated in an elastic adhesive. The other plate can then be applied and sealed to the first.

According to the invention, Cs-137 and Co-60 sources can be used in place of the activated iridium.

While the preferred form of the sources is of relatively short elongated members, e.g. wires, other configurations may also be used, e.g. the sources can have a flat disk shape. In general it is important to provide the sources in such configuration that they can lie in a planar array.

It has been found to be advantageous to provide the plate so that the planar irradiator can be readily removed and/or replaced and to allow the positions of the irradiator to be selected or changed, thereby ensuring radiation with the desired geometry.

The cage is accessible in the usual manner to allow access to the animals for study, testing or examination, and to allow, for example, cleaning of the animals or the cage outside the radiation field. The positioning elements can be trough-like or upwardly turned positioning elements for the bottom irradiator while the ceiling irradiator of the cage can have downwardly turned trough-like positioning members.

The ceiling irradiator may have, on its side turned away from the interior of the cage along its upper surface, a handle or grip which allows the entire cage to be transported or the irradiator to be removed.

It has also been found to be advantageous to provide, between the planar irradiators and the interior of the cage, means for removably accommodating absorber layers, such as lead plates or foils to allow the intensity of radiation to which the animals may be exposed to be varied.

BRIEF DESCRIPTION OF THE DRAWING

The above and other objects, features and advantages of the present invention will become more readily apparent from the following description, reference being made to the accompanying drawing in which:

FIG. 2 is a plan view showing the distribution of Ir-912 radiation sources in a planar irradiator;

FIG. 3 is an enlarged cross section of a planar irradiator of the present invention.

SPECIFIC DESCRIPTION

Figure 1:
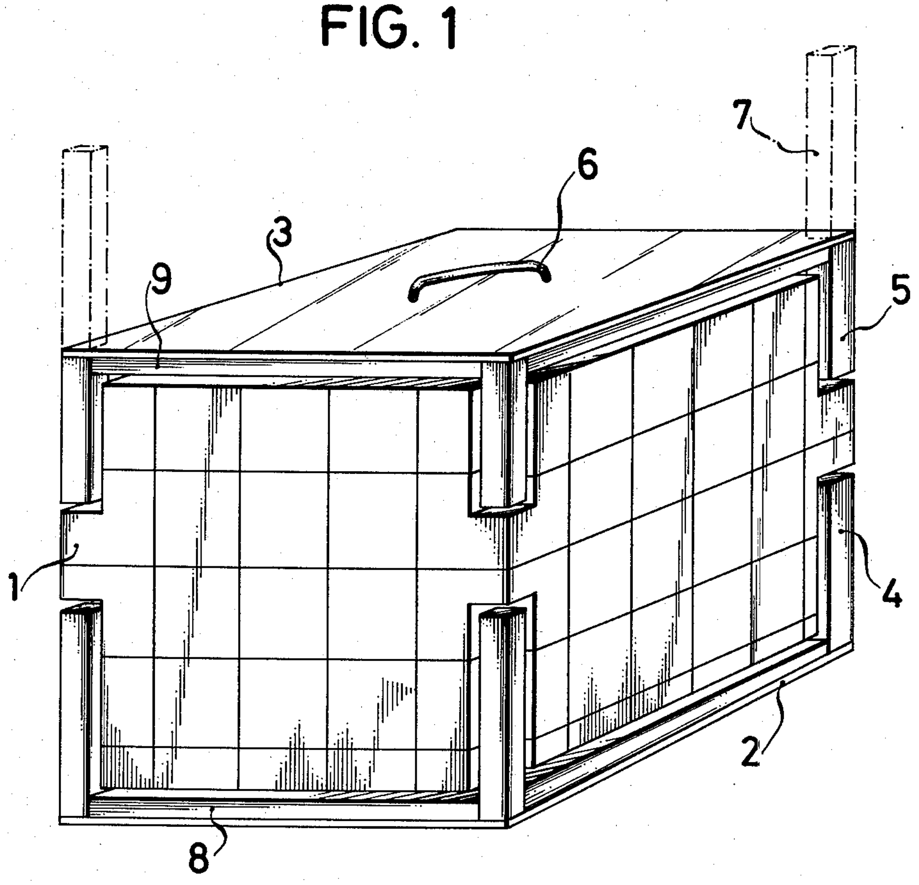
FIG. 1 is a somewhat diagrammatic perspective view of a cage provided with planar irradiators according to the present invention.

FIG. 1 shows a cage 1 for research animals to be irradiated which has a floor irradiator 2 and a ceiling irradiator 3 which has positioning elements such as bars 4 with respect to the open work of the cage.

The ceiling irradiator 3 is provided with a handle 6 so that the cage can be gripped or engaged by a remotely actuated manipulator. Positioning elements 7 may be extended upwardly and/or downwardly, e.g. as shown in broken lines, so that other cages can be stacked upon the cage illustrated or these elements can be used as grips for engagement with or by a manipulator.

The ceiling and floor irradiators 2, 3 can each have the distribution of radiation sources shown in FIG. 2.

In this FIGURE, the radiation sources are shown to be short lengths of activated wire disposed in three concentric rectangular or closed rectangular rings. The spacing between the two outermost rings is less than the space between the innermost ring and the intermediate ring.

As can be seen from FIG. 3, each of the plates constituting a planar irradiator can consist of a pair of polymethylmethacrylate plates 10 and 11 (e.g. of plexiglass) between which the activated iridium wires are sandwiched. Each iridium wire 12 can be positioned in a bed 14 of elastic adhesive in a recess 13.

Sixty iridium wire pieces each having a length of 3 mm and a diameter of 0.5 mm with a starting activity of 1 mC are with a spacing of 2 cm into two concentric rectangles, the outermost rectangle having dimensions of 14 cm×20 cm.

Another 10 such wire-section sources are placed as shown in FIG. 2, in a small inner rectangle of dimensions of 2 cm×8 cm. The construction shown in FIG. 3 was used and the cover plate 11 was sealed to the plate 10.

With the cage of 6 cm×12 cm×8 cm with both ceiling and floor irradiators of this construction, the starting dose is 16 rad/hour at the center of the space enclosed in the cage with the same radiation dosage ±10% at each point therein assuming that the activity of the sources varies only within ±5%.

Testing the radiation floor at various positions with thermo-lensed dosimeter or ionization-chamber measurements, the measured radiation was within 3% if calculated variously at the center of the cage and better than 10% at the outermost corners. Animal tests showed a maximum deviation of ±10%. In the construction of FIG. 3 of activated iridium wire, useful life of the planar irradiator was 6 months and only then was replacement required.

Figure 4:
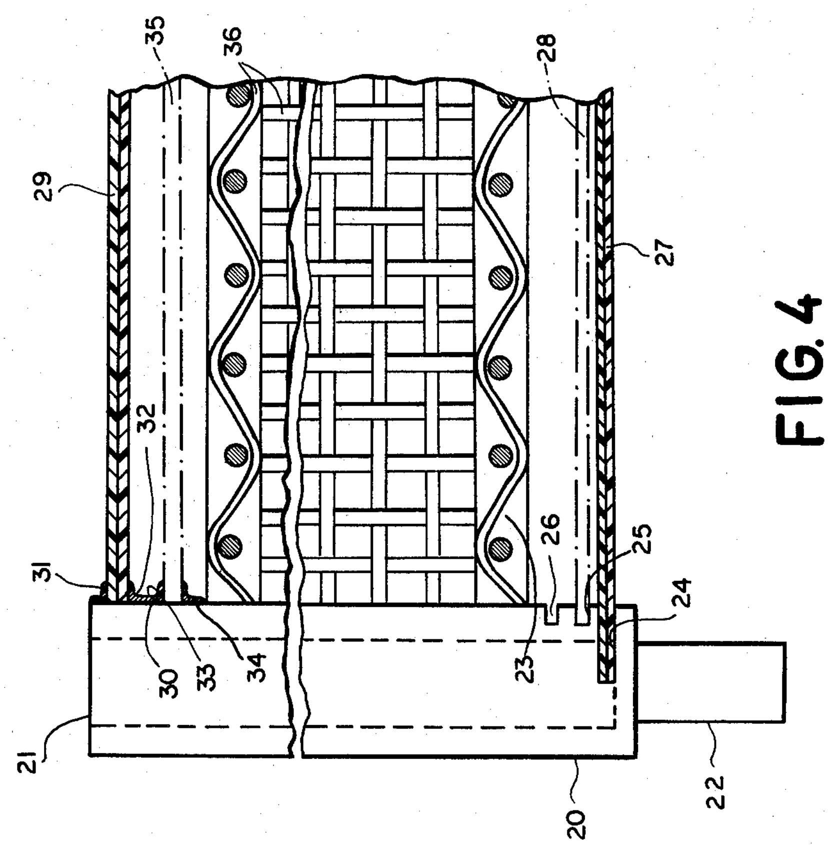
FIG. 4 is a diagrammatic section illustrating features of the invention.

In FIG. 4 I have shown a construction in which a corner member 20 of the cage is formed at its upper end with a socket 21 adapted to receive a plug 22 of the next higher cage, each corner member 20 being provided with such a plug as shown. Below the cage floor 23 which can be formed as an openwork, the posts 20 are provided with slots 24, 25 and 26. A composite planar irradiator 27 is inserted into the slots 24 of the posts to form the floor or bottom irradiator while a lead plate 28 can be inserted in the slots 25 and yet another lead plate in the slots 26 to reduce the radiation level to which the animals are exposed. Naturally, the openwork 23 can be eliminated if the lead plates 28 or the planar irradiator 27 are to form the floor surface upon which the animals rest.

The upper planar irradiator 29 is removably slid into slot 30 formed by an angle piece 31 and a channel 32 which, in turn, forms a slot 33 for receiving a lead radiation shield partially opaque to radiation or serving as a moderator. Another channel 34 can be provided to receive the removable lead plate 35. The other openwork structures 36 of the cage have been represented diagrammatically.

The use of lead plates between the open space of the cage and the planar irradiators may be practical in the embodiment of FIG. 1 as well in which spaces 8 and 9 are provided for this purpose.

I claim:

1. A device for the irradiation of animals, especially experimental animals, which comprises a cage for receiving said animals and formed with a ceiling member along a top of the cage, a floor member along the bottom of said cage, an openwork between said members around the periphery and along the top and bottom of the cage, said openwork forming side, top and bottom walls of the cage, and at least one planar irradiator provided as one of said member and having a removable plate formed with radiation sources in the form of radioactive wire sections distributed over the area of said one of said members to form a uniform radiation field over the area of said one of said members, said one of said members being provided with positioning elements at the corners thereof engageable with the openwork structure to removably mount said planar irradiator on the cage.

2. The device defined in claim 1 wherein each of said members is formed with a planar irradiator.

3. The device defined in claim 1 wherein said planar irradiator comprises a multiplicity of small radiation sources in a planar array embedded between synthetic resin plates.

4. The device defined in claim 3 wherein said array consists of a plurality of rectangular concentric rings.

5. The device defined in claim 1 wherein said elements extend upwardly and said planar irradiator forms part of said floor member.

6. The device defined in claim 1 wherein said elements extend downwardly and said planar irradiator forms part of said ceiling member.

7. The device defined in claim 1, further comprising means for selectively positioning at least one absorber layer between said planar irradiator and the interior of said cage.

8. A device for the irradiation of animals, especially experimental animals, which comprises a cage for receiving said animals and formed with a ceiling member along a top of the cage, a floor member along the bottom of said cage, an openwork between said members along the periphery of the cage, and at least one planar irradiator provided as one of said members, said cage having interior dimensions of 6 cm×12 cm×8 cm, said planar irradiator comprising 60 Ir-192 activated wire section sources each of a length of 3 mm and a diameter of 0.5 mm disposed in two concentric rectangular rings with an outermost ring having dimensions of 14 cm×10 cm and 10 Ir-192 wire sections forming an inner rectangle of 2 cm×8 cm.

9. The device defined in claim 1, further comprising means for stacking a number of such cages together and positioning them relative to one another.

* * * * *